United States Patent Office 3,841,985
Patented Oct. 15, 1974

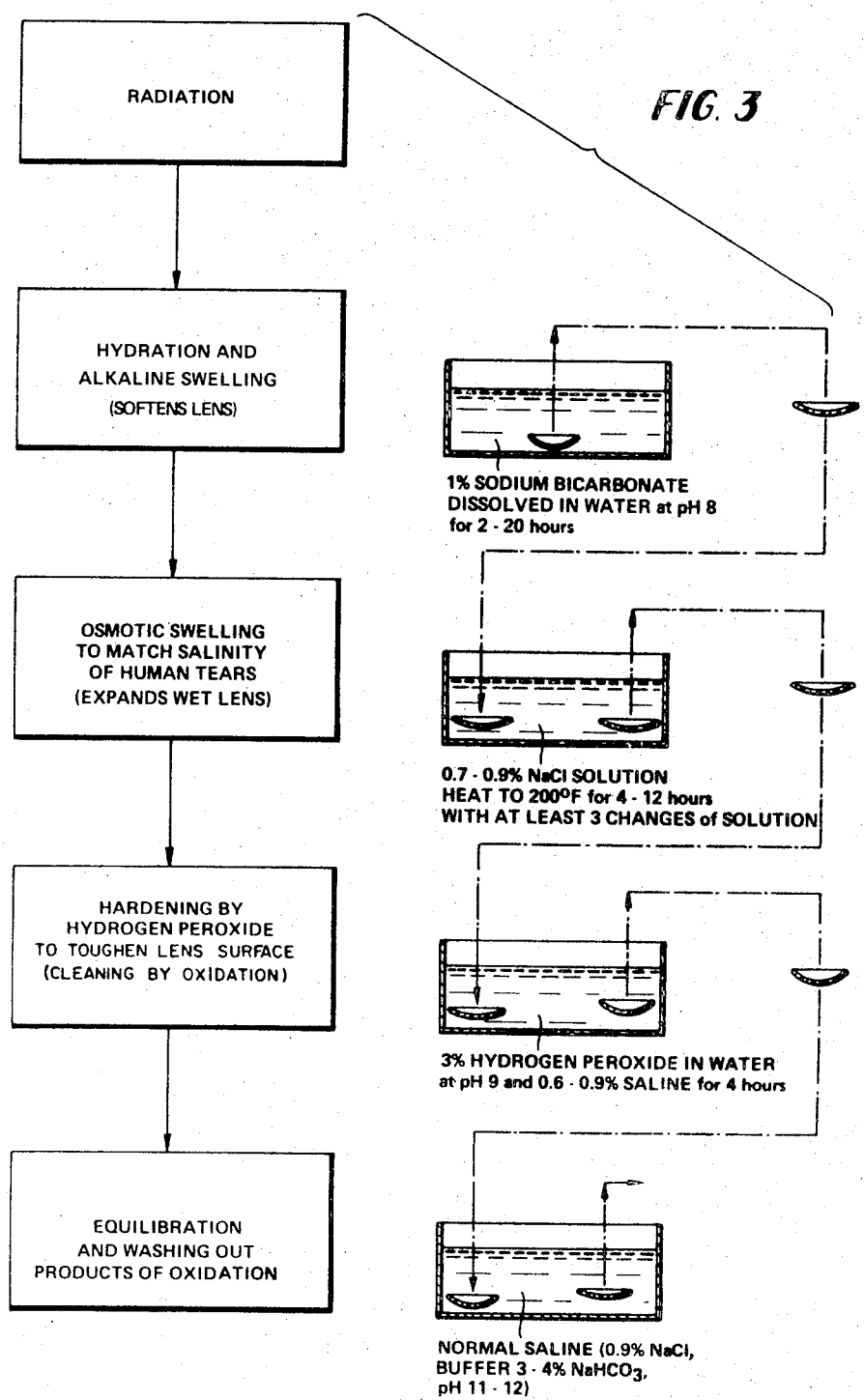

3,841,985
IRRADIATED COMPOSITION FOR SOFT CONTACT LENS
Kenneth F. O'Driscoll, Williamsville, and Allan A. Isen, Buffalo, N.Y.; said Isen assignor to Warner-Lambert Company, Morris Plains, N.J.
Original application Nov. 30, 1969, Ser. No. 880,828, now Patent No. 3,700,761. Divided and this application Aug. 25, 1972, Ser. No. 283,778
Int. Cl. B01j 1/10
U.S. Cl. 204—159.16        1 Claim

ABSTRACT OF THE DISCLOSURE

Graft or block copolymers of hydroxy alkyl methacrylate esters and polyvinyl pyrrolidone are (1) cast in a shaping mold as a monomer-polymer dispersion, polymerized to a solid at 40–60° C. in the presence of low and medium temperature free radical initiators, (2) the solid taken out of the mold and heated to 90–120° C., and then post-polymerized by (3) radiation while dry and by (4) hydrogen peroxide treatment to form hygroscopic, solid, shaped masses which may be cut in the dry state, after step (2), into contact lenses. The lenses may be equilibrated in the wet state by hydrating with normal saline solution. The lenses may be cleaned by treatment with hydrogen peroxide. Steps (3) and (4) toughen the lens, increase its elasticity and its elastic recovery and improve its dimensional stability. From 20–45% by weight of polyvinyl pyrrolidone imparts hygroscopic and unusual water-swelling characteristics. The water-swollen lens contains from 40–80% water, preferably from 50–55%, and in isotonic saline, the water content changes to about 52–58%. As a result of the polyvinyl pyrrolidone incorporation, the lens is readily cleaned after use in the eye with dilute hydrogen peroxide to rid it of imbibed muco-protein, catalase and the like.

CROSS-REFERENCES TO RELATED APPLICATIONS

This is a division of application Ser. No. 880,828, filed Nov. 30, 1969 and now Pat. No. 3,700,761 issued Oct. 24, 1972.

BACKGROUND OF THE INVENTION

(1) Field of the Invention

The invention relates to a method of shaping and polymerizing, at low (40–60° C.) and medium temperatures (90–120° C.), a monomer-polymer dispersion by casting in a mold and continuing the polymerization after removal from the mold, the dispersion consisting preferably of 20–45% of polymerized vinyl pyrrolidone and 80–55% of monomethacrylate ester of a glycol selected from the group consisting of ethylene glycol, propylene glycol, diethylene glycol and dipropylene glycol, there being present no more than about 1% by weight of methacrylic acid and no more than 0.2% by weight of the dimethacrylate of the aforesaid glycols. Amounts of impurities in excess of these limits cause haze or cloudiness in the product, undue hardness of the casting after hydration, and lessen the amount of water which is absorbed by the hygroscopic solid polymerized product. The monomer is essentially pure hydroxy alkyl methacrylate ester.

An essential feature of the method of the present invention is the stagewise post-polymerization of the bulk polymerized solid casting after free radical initiation at low (40–60° C.) and medium (90–120° C.) temperatures by means of (a) polymerizing radiation of the dry solid, and (b) hydrogen peroxide treatment of the water-swollen product in an isotonic salt solution which toughens the solid post-polymerized product into completely hydrated condition (swollen with from 45–80% water) which is proportional to the polyvinyl pyrrolidone content.

(2) Description of the Prior Art

Fields U.S. Pat. 2,136,422 shows the bulk polymerization of ethylene glycol monomethacrylate with free radical initiator such as benzoyl peroxide at elevated temperatures in order to obtain a completely transparent, solid product which is cut and turned on a lathe to make a furniture leg or the like.

Armen et al. U.S. Pat. 3,086,956, in Example 7, shows polymerization of polyglycol monomethacrylate with polyvinyl pyrrolidone and ammonium persulfate initiator at pH 5 in the presence of water to provide a graft copolymer in the form of a turbid aqueous solution containing 19.7% solids.

Ackerman et al. U.S. Pat. 2,923,692 shows lightly cross-linked copolymers of esters of methacrylic acid and vinyl pyrrolidone (see column 7, line 32). The products of Ackerman et al. contain highly water-sensitive, cross-linked acrylic acid groups which can be neutralized with alkali to form a smooth, non-grainy mucilage after the product has been purified by washing, dried and then ground in a homogenizer or colloid mill.

The bulk polymerized ester of Fields, neutralized, hydrated, washed and ground by the method of Ackerman et al., would be expected to give a mucilage or glue. It has been found that before grinding, the product has limited hydration capacity (maximum of 20–30%) even with substantial amount of acrylic or methacrylic acid being present in the interpolymer or copolymer. Commercial soft hydrophilic lenses made under the trademark "Soflens," described in U.S. Pat. 3,408,429, are discussed more fully below.

Robinson U.S. Pat. 2,941,980 shows water-soluble polymers and copolymers of pyrrolidone with various monomers, such as acrylic acid, vinyl acetate and the like, and these water-soluble polymers are mixed with alkylated phenols serving as plasticizers to provide coatings for bases of metal, paper, glass, etc., to afford protection against water.

The accelerating effect of up to 1% of vinyl pyrrolidone on the polymerization of methacrylate esters is taught by Munday et al. U.S. Pat. 3,232,912, but the polymerized products which are produced are liquids or low-melting solids, useful as detergents in lubricating oils or as sludge dispersants in heating oils.

Copolymers of vinyl pyrrolidone and acrylic acid, as in Robinson, or graft polymers of polyglycol methacrylate with polyvinyl pyrrolidone, as in Armen et al., are not satisfactory as water-swollen, tough contact lens blanks. These products form low-strength films which, when wet with water, are easily distorted by tensile forces and exhibit poor recovery, inadequate elongation and inadequate toughness.

One would not expect that graft polymers in proportions taugh by Ackerman et al., Armen et al., Robinson or Munday et al. might be useful to form tough, transparent, water-swollen contact lenses, capable of being sterilized and cleaned with hydrogen peroxide.

SUMMARY OF THE INVENTION

In general, the method converts a free radical initiated solid polymer containing polyvinyl pyrrolidone and polyhydroxy alkyl methacrylate to a highly permeable, soft, hydrated, shaped mass having improved toughness, elasticity and recovery by treating the dry solid mass with radiation to aid densification and thereafter hydrating the mass in saline solution and treating with hydrogen peroxide to cause further toughening by chemical interaction between the polyvinyl pyrrolidone and polymerized methacrylate.

In a preferred form, a tough, soft, hydrated, fluid-permeable contact lens cut from a hard blank is prepared by casting a composition consisting essentially of 20–45% of solid, high molecular weight polyvinyl pyrrolidone in a network of 80–55% of hydroxy ethylmethacrylate, hydroxy propylmethacrylate, or diethylene glycol monomethacrylate which may contain, as impurities, less than 1% of methacrylic acid, preferably not more than 0.2%, and up to 0.2% of ethylene glycol dimethacrylate. The polymerization of the bulk matrix and preformed polymer is carried out in stages, first in a casting mold and then outside of the mold, as follows:

(1) In the open cylindrical casting mold with a low-temperature peroxide, such as acetyl peroxide, di-secondary butyl peroxy dicarbonate, cyclohexanone peroxide, etc., at 40–60° C. for a period of 4–24 hours;

(2) Out of the mold with a medium-temperature, free radical initiator, such as benzoyl peroxide, diethyl peroxide; azoisobutyronitrile, orthotolyl peroxide, etc., at a temperature of 90–120° C. for a period of ½ to 2 hours;

(3) Out of the mold as a shaped, hard, polymerized mass with actinic or high energy radiation, such as ultraviolet radiation, gamma radiation, etc., after the lens has been cut to size; and, (4) Finally with hydrogen peroxide in hydrated condition and in the presence of salt which produces the osmotic equivalent of normal saline solution, whereby the cut, water-swollen lens, containing from 40–80% water, preferably 50–60% water, is toughened in the wet condition.

Step (3) increases the toughness of the lens in hydrated condition, as measured by a bubble bursting test which blows compressed air on the lens to break or burst it, and step (4) further increases the toughness of the water-swollen lens and aids in cleaning the lens of debris which accumulates thereon from the eye.

It was completely unexpected to find that a low methacrylic acid medium will provide a graft of hydroxy ethylmethacrylate which is formed with polyvinyl pyrrolidone and thereby provide castings from these materials in bulk which are tough, dimensionally stable and uniformly reproducible in hydrated, swollen form to contain from above 40% and preferably 50–60% water in which the permeability of the hydrated product has been increased by post-polymerization treatment, first with radiation when dry and then with hydrogen peroxide in isotonic salt solution.

The function of polyvinyl pyrrolidone in responding to hydrogen peroxide treatment which, in the preferred embodiment of the invention, has a Fikentscher K value of from 30 to 90, appears to be a critical aspect of the new and unexpected properties of toughness, elastic recovery and elasticity developed by the graft copolymer with hydroxy alkyl acrylate.

Polyvinyl pyrrolidone is comparable to gelatin and albumen in respect to its high affinity for water and its low toxicity and general biochemical inertness. The polyvinyl pyrrolidone which is preferred for the present contact lens manufacture has a Fikentscher K value of 33, corresponding to a molecular weight between about 25,000 and 50,000, the number average molecular weight by osmosis being about 37,000 which is about half of that of bovine serum albumen. The carbonamide groups present in gelatin are responsible for thread-like structures in the hydration of gelatin emulsions which have been detected under the ultramicroscope in grainless photographic emulsions containing from 5–10% of gelatin in solutions adjusted to the isoelectric point. Surprisingly, electron microscope photographs of the hydrogen peroxide-treated lens structures of the present invention show no threads. Polyvinyl pyrrolidone imparts hygroscopic characteristics to the product, is distributed in the matrix and takes part in chemical interaction with hydrogen peroxide. There appears to be increased permeability and diffusibility of solutes in water through the polymer membrane. This polymer membrane, used as a contact lens, can be cleaned with hydrogen peroxide to remove catalase deposited from tears and organic debris which tend to accumulate in the Wichterle hydrophilic contact lenses.

The hydrogen peroxide has the effect of clearing the lens of any catalase or of any other mucoprotein of the eye. At the same time, it increases the strength at a slow rate without affecting the fluid permeability which is so important to the performance. This is over and above the initial toughening of the product which is achieved by the first wash in hydrogen peroxide. The use of the peroxide, therefore, becomes a maintenance procedure which not only sterilizes the lenses but maintains clarity, transparency and fluid permeability.

Accordingly, this treatment permits freedom from eye irritation and prevents the development of edema under the lens when the lens is worn continuously for 24 hours and longer.

The hydrated hydrogen peroxide-treated product of the present invention appears to possess significantly different properties from gelatin in its resistance to change by acids, alkalis and relatively high temperatures in the wet condition. Gelatin, being amphoteric, reacts with acid and alkali and reversibly dissolves on heating unless it is denatured and flocculated by overheating when wet. In contrast, the present product withstands boiling water for periods up to 72 hours without alteration of its desirable permeable characteristcs. Although the chemical mechanism of alteration of carbonamide linkages by radiation and hydrogen peroxide polymerization is not fully understood, it is clear that a critical and significant enhancement of physical properties has been achieved and this could not be obtained by any other method.

BRIEF DESCRIPTION OF THE DRAWING

In the fabrication of a soft, water-swollen, plastic contact lens from a hard, dry blank by the preferred method of the invention, a simple casting apparatus is used for shaping the blank and for polymerizing the blank which is illustrated in the attached drawing, in which:

FIG. 3 is a flow diagram showing the manufacturing steps taken in a particularly preferred embodiment whereby radiation treatment, water-swelling in alkaline medium, osmotic swelling and hydrogen peroxide hardening are carried out to improve the physical properties and water permeability and to diminish osmotic swelling of the cut and polished lens;

DESCRIPTION OF THE PREFERRED EMBODIMENTS

Example 1

Figure 1:
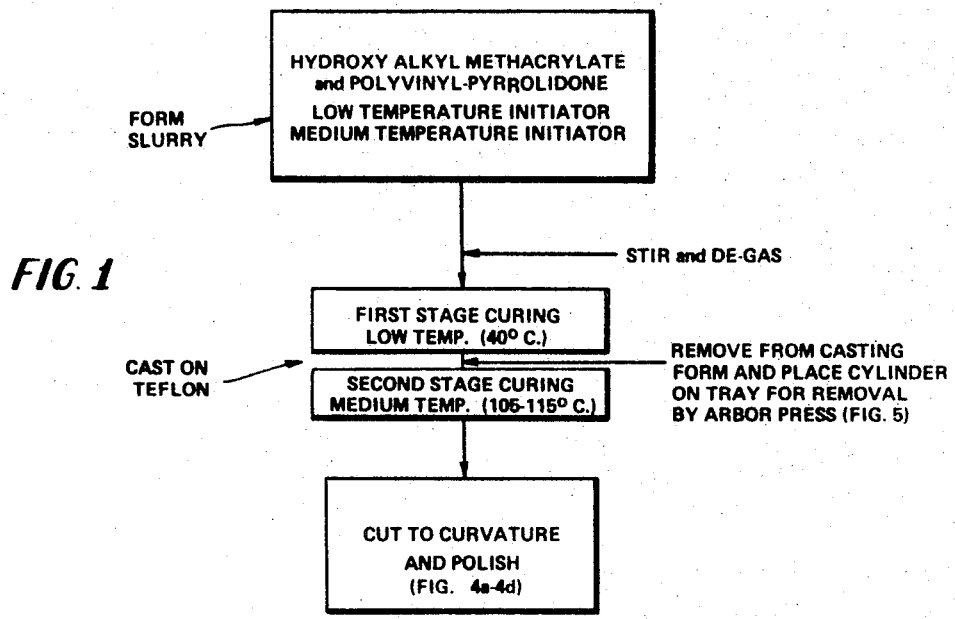
FIG. 1 is a flow diagram showing mixing of ingredients, stirring, degassing, pouring into the mold and placing the filled mold into the oven for the first and second stage curings at low and medium temperatures, respectively, to produce a hard, transparent, shaped mass which is cut and polished.

To 120 parts of distilled hydroxyethylmethacrylate containing up to .2% of ethylene glycol dimethacrylate and less than 1% of methacrylic acid as impurities were added 40 parts of powdered polyvinyl pyrrolidone (Plasdone C Grade, supplied by GAF Corporation) having a Fikentscher K value of 33, number molecular weight of 37,000, molecular weight range of 25,000–50,000 with the upper 15% of K value distribution being 39% by weight of the polymer and the lower 25% of K value distribution being 18.5%. This polymer, hereinafter termed PVP, is hygroscopic and had a moisture content of about 3%, but picked up 1 or 2% additional moisture from the atmosphere in the plant.

A 40 part portion of the liquid methacrylate, hereinafter termed HEMA, was mixed with catalyst, e.g. 0.2 grams of benzoyl peroxide in powdered form and 0.2 grams of di-secondary butyl peroxy dicarbonate, available under the trade name of Lupersol 225 from Lucidol Chemical Corporation, Buffalo, N.Y.

The catalyst-liquid mixture, 40 parts, was added to the PVP-HEMA mixture, 120 parts, and was mixed carefully to provide 160 parts of monomer with 40 parts of polymer dispersion or slurry. These proportions cut down the shrinkage as compared with liquid HEMA alone. The amount of secondary butyl peroxy dicarbonate catalyst which is particularly effective at a temperature of 40–60° C. and of benzoyl peroxide catalyst which is particularly effective at 90–120° C. is .2 part of each catalyst per 200 parts of liquid PVP mixture containing 160 parts of liquid monomer and 40 parts of PVP, e.g., a proportion of about 0.1% for each of these catalysts. PVP was present in an amount of 20% by weight of the dispersion. The dispersion was de-aerated to permit air bubbles to escape, and the mold was filled in the manner shown diagrammatically in FIG. 1. The tray of molds was then placed in an air circulating oven for 20 hours at a temperature of 40° C. At the end of this time, the molds were removed from the oven and taken apart by using a small arbor press against the flat end of the Teflon core at the bottom of the mold unit. This forced the cast blank out of the other end of the sleeve. The cast blanks were placed on aluminum sheets and returned to the oven where they were post-cured at a temperature of 110° C. for 1½ hours. When the trays were removed from the oven, the finished cast plastic blanks were a polymer consisting of PVP to which poly-HEMA had been grafted.

Example 2

The casting procedure set out in Example 1 was carried out, but instead of using 20% by weight of PVP, 30% by weight was used. The lens made by the technique of Example 1 contained about 55% of water as measured in isotonic saline and resulted in a lens that came up to the exacting standards set for Example 1.

Example 3

The process of Example 1 was repeated, except that diethylene glycol monomethacrylate was used with 25% by weight of PVP. This lens, too, met the standards set in Example 1.

Example 4

The process of Example 1 was repeated except that instead of 20% of PVP, 35% by weight was used. The resulting lens came up to the standards set for Example 1.

Example 5

A mixture of 80 parts of hydroxy propyl methacrylate and 80 parts of HEMA was used for the monomer phase with 20% by weight of PVP and the process of Example 1 was repeated. The resulting lens came up to the high standards set for Example 1.

The water content of the lens made and tested in Example 1 was about 51% in water and about 49.5% in 0.9% salin solution. In contrast, the water content of poly-HEMA from which PVP has been excluded is about 38% and 36%. The water content of the remaining examples was substantially the same as that in Example 1. Generally, the main differences imparted by substituting propylene glycol monomethacrylate or diethylene glycol monomethacrylate is to lower the refractive index and to make the polymerized solid slightly more flexible.

If, in the foregoing examples, PVP is used in an amount less than 20%, the water uptake value of about 50–60% is not achieved in the hydrated water-swollen polymerized mass and the desired toughening and increase in strength are not achieved by subsequent hydrogen peroxide treatment.

If the low temperature initiator is omitted and polymerization is carried out at 90–120° C. for ½ to 2 hours, the solid product is not uniform in physical properties nor does it provide the toughening and improved strength necessary to come up to the desired standard. Without both low and medium temperature initiators, the improvement in permeability over the commercial "Soflens" made under the Wichterle patents is not achieved, nor is consistent reproducibility possible.

Accordingly, the crtical two-stage initiation at temperatures of 40–60° C. in the mold to form the solid rod and at 90–120° C. out of the mold, in a tray in an oven, to harden the self-sustaining rod provides a rod of stock material of Shore A Hardness value between 70 and 90 which can be cut and polished into lenses by the familiar technique used with hard acrylic material. Even without further treatment, such lenses can be hydrated and water-swollen to surpass the performance of the presently commercially available hydrophilic lenses.

If more than 45% of PVP is used in the polymerized mass, the mass after hydration becomes excessively soft. Even after post-polymerization, the product cannot be toughened to match the high strength and elasticity values of the preferred examples above. Only in the range of 20–45% PVP can the present polymerized composition, free from cross-linker, match the strength properties of the commercial "Soflens." The "Soflens" material does not possess the same high permeability rate of diffusion which in the present examples is from 10–15 times that of the "Soflens" material.

MANUFACTURING THE LENS FROM THE BLANK

The manufacture of contact lenses in the hard state and the further processing of the lenses after completion and hydration to the soft state are disclosed and claimed in the copending application of Allan A. Isen, entitled "Method of Cutting Hydrogen Peroxide-Treated Soft Contact Lens and New Lens Made Therefrom."

The lenses are made by cutting and polishing the shaped masses in the hard state, as shown in the flow diagram of FIG. 1 and in the views of FIGS. 2, 4a–4d, and 5, so that they appear to be exactly like a hard acrylic contact lens.

Figure 2:
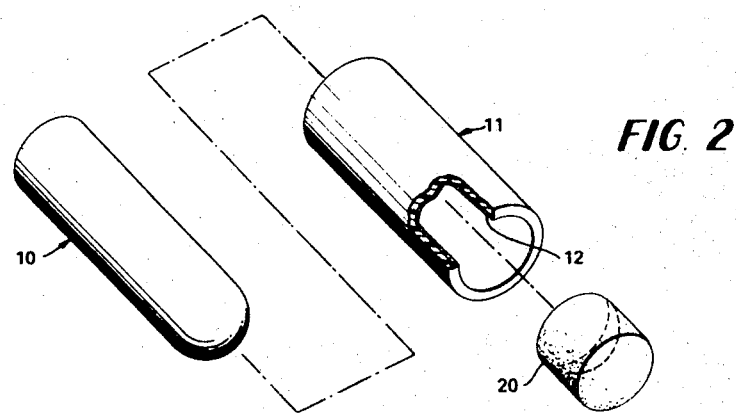
FIG. 2 is a diagrammatic view showing the placement of male and female mold parts to shape the hard, transparent solid which is subsequently cut.

The molding ingredients, comprising the mixture of hydroxy alkyl methacrylate, PVP, low and medium temperature initiators, cure in the first stage in the molds and in the second stage in the trays to produce hard, transparent, shaped, plano-concave cylinders 20, as illustrated in FIG. 2. The concave surface is formed by male mold member 10 fitting into female mold member 11. The interior surface of the female member 11 is coated with Teflon, as is the outer surface of the male member 10. After curing, the Shore A Hardness value of the shaped mass 20 is between about 80 and 90. Subsequent post-polymerization treatment increases the Shore A Hardness value by from 3 to 10 points. At higher PVP concentrations, lower initial Shore A Hardness values are obtained. Subsequent treatment, e.g., post-polymerization, by radiation causes a greater increase in Shore A Hardness at these higher PVP concentrations and this demonstrates that radiation is especially effective in post-polymerization of the PVP moiety in the product. Radiation also tends to cause slight embrittlement so that it is easier to cut the entire mass 20 before radiation treatment.

Because of the PVP content in the lens and the two stages of curing, there is no trace of unreacted material in the cast blank 20 and cut lenses which are formed by the steps shown in FIGS. 4a–4d have water-swelling characteristics far beyond the commercial hydrophilic lenses available in the prior art. The commercial "Soflens," from the Bausch & Lomb Company, has a water uptake of 38% in comparison with a 50–55% water uptake for the cut lens of FIG. 4 herein, prior to radiation and hydrogen peroxide treatment. This combination of high hardness in the dry state and high water uptake in the wet state of the present lens blank material permits an entirely different and simpler manufacturing process to be carried out than with the Wichterle lens which must be cut when mounted on a support, as described in U.S. Pat. 3,361,858. The present material contains no cross-linker as is required in the lens composition of this patent and it is surprising that the substantially pure poly-HEMA matrix of the present invention, having a Shore A Hardness value close to 90, can be easily cut in the dry state to very small tolerances of about 1/100 mm. and thereafter can be hydrated to imbibe at least 50% more water than the prior art lens. This cutting in the dry state permits thinner edge sections to be produced and permits uniformity in lens manufacture which cannot be achieved in the prior art manufacturing methods.

In the hard state, the index of refraction of the cast blank 20 is approximately 1.49. In the hydrated state, the index of refraction of the lens is approximately 1.39 to 1.40. The lenses become larger, thicker and flatter when they are changed to the soft state by hydration. In the cutting and polishing processing of the lenses, an additional reversal in shape occurs and they become somewhat steeper and slightly smaller in diameter. All of these changes are taken into account to produce the desired specifications of curvature and dimension in the hydrated state.

The lens blank 20 is a small cylinder with a concave curve at one end which must be optically finished and a small amount of stock is removed from this surface, e.g. a minimum amount of about .2 mm. in thickness and a maximum of .5 mm., the removal being symmetrical and from the entire surface.

The following are the steps in manufacturing after the low temperature and medium temperature cures of the blank 20. After the low temperature cure, the blank 20 is removed in the manner shown in FIG. 5 wherein ram 13 pushes against the planar surface of the blank to eject the blank from the female mold member 10. The blank is removed from the same end into which the dispersion or slurry was poured and this removal is completely different from that which is carried out in U.S. Pat. 3,361,858, wherein the lens is molded to size on a mount and is removed from the mount by immersing in water to swell it and allow it to be peeled from the mount. After this, the blank of the present invention is cured in the medium temperature stage on trays and the steps below are followed:

Step 1—Cutting

Figure 4A:
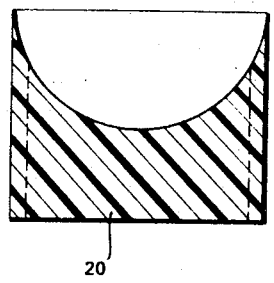
FIGS. 4a, 4b, 4c and 4d show stages in the cutting of the shaped mass ejected from the mold in FIG. 2 in achieving the finished lens; and, FIG. 5 is a sectional view which shows the relation of the mold parts and the hard, transparent, shaped mass after one-stage curing and before ejection from the mold.
Figure 4B:
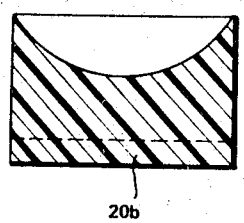
Figure 4C:
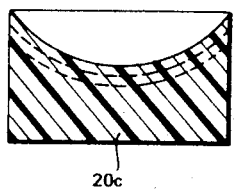
Figure 4D:
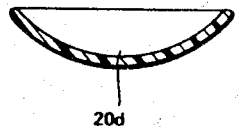
Figure 5:
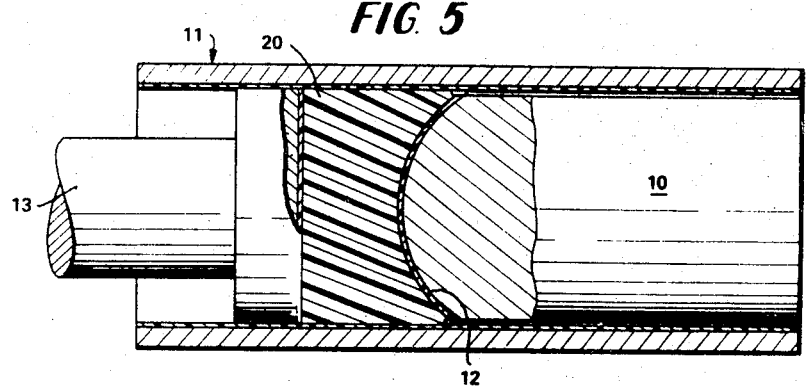

The cutting steps are shown diagrammatically in FIGS. 4a–4d. The dotted lines in FIG. 4a show removal of peripheral or radial portions of the blank in order to cut the 180° arc down to about 120°, as shown in FIG. 4a and in FIG. 4b. The planar surface is then cut along the dotted line shown at the bottom of FIG. 4b in order to facilitate mounting the blank on a lathe, and this blank is shown in FIG. 4c. Where the chuck of the lathe can handle the form shown in FIG. 4b, the planar cut shown in FIG. 4c is not required. The concave cut is made along the dotted line shown in FIG. 4c and the cut lens is shown in FIG. 4d.

In the lens made in accordance with the present invention, the flat surface of the back of the blank is faced off in the manner shown in FIGS. 4b and 4c and the center of the flat surface is tapped to make a pivot depression on a small jeweler's lathe. The diameter of the blank was reduced in a Levin lathe to a size .1 mm. larger than the desired finished lens size (see FIG. 4a). The radius cut on the concave surface matched the surface.

Step 2—Polishing of Inner or Back Surface

The base curve blank was then mounted on an optical polishing machine and it was polished against a brass lap coated with adhesive tape whose curve matched the base curve of the blank. In the polishing, the lens blank rocked back and forth on the polishing lap, and spun at the same time. Two polishing cycles were used. The first employed Snow Floss Compound, made by Johns Manville, mixed with odorless kerosene to the consistency of a thick paste. This rough polish procedure was used for 3 minutes. The finished polish was done with U.S. Pat. Grade of Zinc Oxide, made by Merck Pharmaceuticals, mixed with vaseline to form a paste. This cycle also lasted for 3 minutes. When the curve was finished, it was measured with a radioscope for radius and quality to have a radius of curvature within plus or minus .04 mm. of the original lathe radius cut.

Step 3—Radius Cutting the Outer or Front Surface

The finished base curve was now mounted onto a brass or plastic chuck preparatory to radius cutting and polishing the front surface. This chuck has a finished, polished, convex surface which matches the base curve of the blank. The rear of the chuck fits into a collet of a small, high precision jeweler's lathe made by Levin & Sons. The chuck was heated slightly, sufficiently to melt some mounting wax on the surface of the chuck. The finished base curve was pressed firmly onto this surface and was allowed to cool. The chuck was then mounted in a Levin lathe and its front surface was radius cut in two stages. In the first stage, rough cutting removed all of the stock. In the second stage, finish cutting produced a highly smooth radius cut and an exact center thickness. The thickness was measured by a regular plunger thickness gauge through the small diameter hole in the center of the chuck, which was also used for evaluating the optics as the lens was being finished. The front surface was then polished on an optical polishing machine. The chuck mounted on a vertical spindle and rotated as a polishing lap coated with adhesive tape rocked back and forth over the surface, spinning at the same time. The polish used was Snow Floss Compound mixed with odorless kerosene to the consistency of thin paste. It required 3 minutes to complete the surface, and the optical quality was judged by removing the chuck from the spindle and viewing the optics in a lensometer through the hole in the chuck.

Step 4—Cutting the Lenticular Groove on Minus Lenses

On minus lenses, it is necessary to thin the edge by adding a minus lenticular cut to the peripheral region of the front of the lens. This is done with a single edge razor blade and polished with molefoam and the zinc oxide polishing solution. The width of this front lenticular region should not be greater than ½ of the diameter of the lens.

Step 5—Adding Inside Bevel and Inspection

The lens was then removed from the chuck by heating the bottom of the chuck until the wax softened and the lens could be slid off the chuck easily, and was then cleaned in a test tube with Xylene which was put into an ultrasonic cleaner.

The finishing of the lens included the addition of a small flat bevel to the inside aspect of the edge approximately .3 mm. wide. This was put on by grinding against an emery sphere or a diamond impregnated lap, and polishing against a matching felt lap. Following this, the edge was rounded and polished against a polyurethane sponge saturated with the polish mixture or zinc oxide and odorless kerosene. The lens was then recleaned in Xylene in the ultrasonic cleaner. It was measured and inspected for base curve radius, optical value and quality, thickness and surface scratches.

Step 6—Irradiation Treatment as Shown in FIG. 3

Irradiation is preferably carried out under an ultraviolet lamp which provides a high energy source in the spectral range of 2000 to 4000 angstrom units, for at least ½ hour, preferably 2–4 hours. The bursting strength is increased from 7 p.s.i. gauge to 10.5–11.0 p.s.i. gauge, an increase of at least about 50% of the original value and the hydrated lens loses practically none of its elasticity and rapid recovery. In contrast, the commercial "Soflens," the lens of the prior art, does not improve under irradiation in its bursting strength. Therefore, it is clear that the PVP component in the original composition, as well as the unique two-step polymerizing procedure, e.g. the low temperature initiation and the medium temperature initiation referred to in FIG. 1, coact in a new way with irradiation treatment in the solid polymerized state to produce this new and unexpected result.

Ulraviolet sources, such as the mercury vapor tube, a Xenon lamp, or a carbon arc tube, may be used.

Other irradiation sources which may be used are a cobalt 60 source which emits gamma radiation, spent reactor elements from a uranium pile which also emit gamma radiation, or high energy ionizing radiation from a commercially available source, e.g. Radiation Dynamics, Long Island, N.Y., X-rays may be used at exposure dosages of $10^7$ roentgens for a period of 15 minutes to 1 hour. Gamma radiation dosage for post-polymerization treatment is preferably from about 5 to about 95 megarads for 5 minutes to 1 hour. All treatments by irradiation are carried out at room temperature.

In this irradiation treatment, as shown in FIG. 3, the hard finished lens was placed under a pure ultraviolet light for a period of 3½ hours. The light source was 6" from the lens. The unit was covered to prevent light loss and the polymerization of poly-EMA and PVP was completed in 2 hours. The light source was a 250 watt Spectraline ultraviolet lamp.

Step 7—Neutralization, Hydration and Hydrogen Peroxide Treatment

This step accomplished the neutralization and hydration of the lenses. Lenses were placed in a .8% saline bath mixed with sufficient bicarbonate of soda to produce a pH of 8. They remained in this bath for 2–20 hours. Each lens was held by a small "flo-thru" basket made of polypropylene. The lenses were then placed in a bath of normal saline at approximately 200° F. for 1 hour. The bath was then changed to fresh normal saline for a period of 3 hours and then changed again for an additional 4 hours. This boiling was done in a pressure cooker to which a condensing column had been added to prevent evaporation and to increase the concentration of the saline.

The lenses were then placed, for 4 hours, in a bath of 10 volume reagent grade hydrogen peroxide (3% $H_2O_0$) to which had been added sufficient pure sodium chloride to produce the equivalent of a normal saline solution. This caused the lenses to shrink in size and become hypertonic. Following this, they were boiled in the pressure cooker in distilled water for 2 hours and again in normal saline for 2 hours. See FIG. 3.

BURSTING STRENGTH OF THE LENS

The post-polymerization steps (6) and (7), irradiation and hydrogen peroxide, illustrated in FIG. 3 of the drawing, contribute to significant strengthening and toughening of the water-swollen lens and provide thereby advantages not available in any commercial lens of the soft hydrophilic type.

The hard cut lens resulting from the manufacturing operations shown in FIGS. 1 and 4a–4d can be tested for bursting strength by binding the edges about the opening of ¼" pipe and measuring the air pressure required to burst the lens which has been boiled in water for 4 hours to hydrate it. This test carried out with the cut lens of FIGS. 1 and 4a–4d of the invention showed a bursting strength of 7 p.s.i. gauge pressure. This cut lens, based on poly-HEMA matrix containing 20% PVP, matched the bursting strength (7 p.s.i. gauge) of the centrifugally cast "Soflens" containing dimethacrylate cross-linker, thereby showing unexpected improvement in the absence of cross-linker and at almost 50% higher water content (52% uptake in the present lens against 37% in the "Soflens").

After irradiation and hydrogen peroxide treatment by the process of the invention, the bursting strength by the above mentioned test is increased from 10.5–11 p.s.i. up to 16–17 p.s.i. an increase of at least 250% based upon the original bursting strength and an increase of about 100% of the original value as compared with the 50% increase achieved by irradiation.

This enhancement of strength by hydrogen peroxide is uniquely based upon the PVP content since the commercial "Soflens" does not show such enhancement in bursting strength. Uniquely, both the irradiation and the hydrogen peroxide treatments are essential if the maximum bursting strength is to be achieved and if the other lens properties, e.g. controlled elongation in lateral and vertical dimensions in water-swollen state, are to be maintained.

These other lens properties, in water-swollen state, will be more clearly visualized in comparison with the shape and dimensions of the hard lens shown in FIG. 4d. Upon immersing the lens in water at pH 8 after radiation (see Block 3, FIG. 3), the radius of curvature of the lens expands 26%, the core diameter expands 35%, and the thickness expands 23%. These values of anisotropic expansion do not change if the lens is immersed in saline (Block 4, FIG. 3). The water uptake is between 48 and 55%.

The hydrogen peroxide treatment accomplishes the most surprising improvements in the physical properties of the hydrated, water-swollen lens which facilitate maintenance and cleaning of the lens by the patient. By this treatment, there is accomplished, as mentioned above, an increase in bursting strength after irradiation of 10.5–11 p.s.i. up to 16–17 p.s.i., gauge pressure. If alkaline bicarbonate solution (1%) at pH 8 is repeatedly applied to the lens, a slight softening occurs and the bursting strength falls to about 12.5–13.5 p.s.i. This effect is reversed by immersion in 3% hydrogen peroxide to regain the 16–17 p.s.i. value. Repeated treatment with hydrogen peroxide interspersed with softening treatment by alkaline bicarbonate solution increases the bursting strength still further up to values of 19–20 p.s.i.

FLUID PERMEABILITY CHARACTERISTICS

The fluid permeability of the lenses of Example 1 was studied and compared with the Bausch & Lomb "Soflens," made by the process of Wichterle U.S. Pat. 3,408,429.

Individual vials of sterile fluorescein solution were made up various disodium fluorescein concentrations in 0.1M phosphate buffered saline at a pH of 7.4.

An objective slit lamp fluorophotometer measured fluorescein concentration in the lenses, in the interior segment of the eye, and in the solution. The fluorophotometer consists of a light sensing device built into the eye piece of the lamp and measures the fluorescein concentration in an area 0.08 mm. across. The instrument is accurate to within plus or minus 2%. The unknown is compared with a fresh, stable, standard fluorescein solution.

RESULTS OF IN VITRO STUDIES—FULLY HYDRATED (1) Uptake

Fully hydrated lenses were placed in solutions of various fluorescein concentrations, were rinsed briefly after the test time in saline and were then mounted on the end of a glass test tube for measurement of the fluorescein concentration in the lens.

The lenses themselves absorb less than 3% of the emitted light and do not interfere with the test by reason of light absorption. The volume of the soaking solution is large in comparison to the lens volume.

Lenses fluoresced uniformly under the slit lamp after 90 seconds of soaking in a fluorescein ($5 \times 10^{-3}$ mg./ml.) solution. Three distinct zones were observed in the "Soflens" lenses soaked for 30 minutes due to the fluorescein slowly diffusing to the interior of the lenses. The lenses of the present invention take up fluorescein quite rapidly; uptake is complete in about 2 hours. The Bausch & Lomb lenses ("Soflens") take up fluorescein slowly and continue to do so for over 24 hours, reaching a final concentration approximately 2.3 times that in the lenses of the present invention.

(2) Elution Studies

After a 24 hour presoaking of the lenses in $5 \times 10^{-3}$ mg./ml. fluorescein solution, they were placed in 4 cc. of buffered saline and the time rate of change of fluorescein concentration in the lenses and the eluting solutions were measured. At the end of 1 hour, the lenses of the present invention had released 70% of the fluorescein into solution, while the "Soflens" lenses released 25%. Only after 8 hours did the "Soflens" lenses release 90% of the bound fluorescein.

After elution from each type of lens, it was determined that the "Soflens" lenses took up twice as much fluorescein as did the lenses of the present invention, on a weight basis.

The total uptake of fluorescein was linearly related to the concentration of the soaking solution over a 4000-fold concentration range between $5 \times 10^{-3}$ and 20 mg./ml. The present lenses were air dried, placed in fluorescein solution and the uptake by the dried lenses was substantially identical to the fully hydrated lenses.

RESULTS OF IN VIVO STUDIES

A young female who had worn both conventional and hydrophilic lenses without difficulty was studied. On the first day, she wore a lens of the present invention in one eye and no lens in the other. A single drop of sterile 2% fluorescein was instilled in each eye at 0, 2, 4, 6 and 11 hours. The corneal and anterior chamber concentrations were measured at 2, 4, 6 and 24 hours, each time removing the lens 10 minutes prior to measurement. One week later, the subject wore the Bausch & Lomb "Soflens" in one eye and a methyl methacrylate conventional hard lens in the other. Drops were instilled at 0, 2 and 4 hours and measurements were made at 0, 2, 4 and 6 hours, at which time the Bausch & Lomb lens was removed. The corneal and anterior chamber concentrations of fluorescein are shown in Tables 1 and 2 below. The corneal and anterior chamber concentrations were higher with the lens of the present invention than with the other lenses. There was essentially no difference betwen using no lens, standard methacrylate lens, or the Bausch & Lomb lens. At the end of 6 hours, the corneal and anterior chamber concentrations of fluorescein in the eye with the lens of the present invention were 6 to 8 times that attained with any other mode of treatment. Furthermore, the lens of the present invention was able to maintain the fluorescein concentration in the ocular tissues for 24 hours despite the known rapid exit of fluorescein from the eye. It should be noted that the lens had not been presoaked in fluorescein prior to insertion.

In other studies, the present lenses were presoaked in solutions of 0.1% and 0.01% fluorescein and inserted into the right eyes of three rabbits. At the same time, a drop of the 0.01% solution was put into each of the left eyes. 90 minutes later, the lenses were removed, the eyes were irrigated with saline and the corneal and anterior chamber concentrations were determined. The lenses were then reinserted and the rabbits received 1 drop of the 0.01% solution in the left eye every 30 minutes for 2 additional hours. Saline solution was instilled into the right eye. The corneal and aqueous humor concentrations of fluorescein at 1½ and 3½ hours are shown in Tables 3 and 4 below. The ocular concentrations attained with the presoaked lenses were 4 times higher than those attained with frequent drops. Increasing the concentration of the soaking solution ten-fold resulted in an 800% increase in the ocular concentrations. It took much less fluorescein to get the same ocular concentration if the fluorescein was permeated into a lens than if it was instilled topically.

TABLE 1

Corneal Concentration of Fluorescein With Different Types of Contact Lenses in Place (All values are $\times 10^{-5}$ mg./ml.)

| Time (hours) | Present lens | Bausch & Lomb lens | Methyl methacrylate | No lens |
|---|---|---|---|---|
| 2 | 14 | 6 | 4.5 | 9 |
| 4 | 81 | 17 | 14 | 13 |
| 6 | 150 | 25 | 13 | 24 |
| 24 | 220 | | | 11 |

TABLE 2

Anterior Chamber Concentration of Fluorescein With Various Types of Contact Lenses in Place (All values are $\times 10^{-6}$ mg./ml.)

| Time (hours) | Present lens | Bausch & Lomb lens | Methyl methacrylate | No lens |
|---|---|---|---|---|
| 2 | 17 | 6 | 4 | 13 |
| 4 | 115 | 19 | 19 | 26 |
| 6 | 235 | 27 | 21 | 28 |
| 24 | 184 | | | 14 |

TABLE 3

Corneal Fluorescein Concentration In Rabbits With Presoaked Lenses Of Present Invention (All values are $\times 10^{-5}$ mg./ml.)

(Number of animals in parentheses)

| Time (hours) | Lens presoaked in 0.1% fluorescein | Lens presoaked in 0.01% fluorescein | Topical 0.01% fluorescein |
|---|---|---|---|
| 1.5 | | 107 (3) | 9 (6) |
| 3.5 | 616 (3) | 70 (3) | 19 (6) |

TABLE 4

Fluorescein Concentration In Aqueous Humor Of Rabbits With Presoaked Lenses of the Present Invention (All values are $\times 10^{-6}$ mg./ml.)

(Number of animals in parentheses)

| Time (hours) | Lens presoaked in 0.1% fluorescein | Lens presoaked in 0.01% fluorescein | Topical 0.01% fluorescein |
|---|---|---|---|
| 1.5 | | 42 (3) | 12 (6) |
| 3.5 | 400 (3) | 59 (3) | 16 (6) |

OXYGEN PERMEABILITY STUDIES

The lens of the present invention appears to permit higher transmission of oxygen than the commercially available hydrophilic lens and, as a consequence, is of value in permitting oxygen access across the lens to the cornea.

The lenses of the present invention, made by the two-stage initiation process shown in FIG. 1 without the further steps of irradiation and hydrogen peroxide treatment, exhibit permeability and diffusion characteristics comparable to those pointed out in the studies above; and these lenses, cut from the polymerized rod, as shown in FIGS. 4a–4d, respond to hydrogen peroxide toughening and cleaning, although to a degree substantially less than the lenses which are made by the preferred method of the invention as shown in FIG. 3.

The diffusibility of solutes through the lenses made by the methods of FIGS. 1 and 3 is from about 6 to about 20 times as great as the diffusibility of the commercially available "Soflens," this diffusibility being expressed as the rate of elution of a dilute tracer material through the lens. A comparative diffusion value is demonstrated where a dye is seen to completely diffuse in a few hours through the lens of the present invention, while such diffusion through the presently commercially available lenses takes 24 hours or longer.

The significance of such diffusion is demonstrated when the novel circular lens of our copending application, mentioned hereinabove, is placed in contact with the cornea, over the super-sensitive limbal area, with its thin flap or edge extending a few millimeters beyond the limbus, the limbal area of the lens defining a circular tear visicle which is cut out from the material of the lens adjacent the flap. This novel lens vesicle provides a clear solution of liquid tears adjacent the cornea and osmotic pressure is created in a direction from the less dense tear liquid to the more dense liquid in the cornea to aid in bathing the eye. The semiscleral flap is held to the scleral portion of the eye by capillary attraction. Tears can enter under the flap to replenish the vesicle well which is immediately adjacent the inner edge of the lens. Hypertonic eyedrops instilled into the eye stimulate the washing and cleaning function of the tears, and any medication in these eyedrops diffuses rapidly, in mere minutes, through the permeable structure of the lens.

The hydrogen peroxide treatment appears not only to toughen the lens and raise the bursting strength values, as mentioned above, from 16 p.s.i. gauge to 19–20 p.s.i. gauge, but it also opens and cleans the pores or microvoids in the lens materials through which diffusion takes place. Therefore, hydrogen peroxide at 3% dilution constitutes a maintenance fluid which is used in conjunction with 1% sodium bicarbonate solution, the latter relaxing the pores and softening the lens to aid in cleaning and reducing the bursting strength by 3 or 4 p.s.i. gauge units and the former reversing this decrease to bring the lens back to its maximum toughness after cleaning. Surprisingly, aging of the lens through normal use, e.g. wearing and cleaning, has been found to slightly increase the bursting strength value of the lens by 2 or 3 p.s.i. gauge. Whether the lens is a newly manufactured lens having a bursting strength of 16 p.s.i. gauge or an aged lens with bursting strength of 20 p.s.i. gauge, no difference is found in the corrective function of the lens or in its comfort.

The lenses of the present invention resist the substantial dimensional changes which ordinarily occur when different osmotic salt concentrations are applied. The anisotropic swelling and shrinking characteristics at 50–55% water uptake appear to provide a unique environment for resisting osmotic dimensional change which would cause the lens to shift its position or to flex in response to normal movement of the eyelid or illumination by strong light, irritation and the like.

If a lens is too stiff and insufficiently hydrated, which is the case with the hydrophilic, highly cross-linked presently available commercial lens, the inside curve of the lens must be steeper than the curve of the cornea with a space under the lens in the central region in order to shape the lens to the cornea. It is this space which flexes with each blink. The edge of the hydrophilic lens grabs the cornea at the sensitive limbal area. The inadequate water uptake causes irritation and discomfort. Only by increasing the lens diameter and by providing a very thin, flexible edge can the presently available commercial lens be improved, but the liquid permeability is still insufficient and the optical tolerance can never be as good as in the present lens because the present lens is cut in the hard state with a greater degree of accuracy than can be obtained with the prior art lens which is cut in the soft state. Surprisingly, there is no dimensional change in the present lenses with small changes in hydration, while significant dimensional changes occur with the prior art lenses. Consequently, the fit is flatter and better with the present lens; the optical correction is more accurate; substantially no shifting occurs; and flexing by blinking is completely avoided. In the present lens, the elimination of flexing, the smoother optical finish, the flatter corneal curve, and the limbal tear vesicle make it possible to correct astigmatism in a manner far better than with any lens now available.

The chemical composition of the present hygroscopic lens, e.g. the critical PVP and HEMA content, combined with the critical method of two-step polymerization to permit precision grinding and uniformity, and the postpolymerization with radiation and hydrogen peroxide, provide precision fitting, maximum strength, elasticity and elastic recovery properties, all of which are essential to eye comfort when the lens is worn for long periods of time.

Instead of the polyvinyl pyrrolidone homopolymer, various lower alkyl derivatives thereof may be employed. Such derivatives include:

3-methyl-N-vinyl-2-pyrrolidone
4-methyl-N-vinyl-2-pyrrolidone
3,3-dimethyl-N-vinyl-2-pyrrolidone
4-ethyl-N-vinyl-2-pyrrolidone
5-methyl-N-vinyl-2-pyrrolidone
5-ethyl-N-vinyl-2-pyrrolidone and the like. These example support any PVP having lower alkyl in the 3, 4 or 5 positions.

The composition also has utility as a liquid, hygroscopic coating material which strongly adheres to glass, plastic or metal when cured, after application, in two stages under the temperature conditions shown in FIG. 1. The liquid slurry can be applied in a thickness of 1–10 mils onto a glass tumbler to provide a "frost-free" drinking glass for cold drinks, the glass being free from outside condensation. The coating may be applied to an automobile windshield to make it fog-free on the inside. The coating may be applied to the polycarbonate lenses used in ski goggles or to contact lenses made of CR–39 (polycarbonate) plastic.

The membrane composition may be cast as a desalination membrane and used to remove salt by reverse osmosis.

The membrane may be used as a germicide-carrying bandage for internal and external wounds, and in this aspect of the invention, our copending application for "Soft Plastic Bandage Containing Medicament For Ophthalmic Use" describes the inclusion of antibiotics, corticosteroids, antiseptics and disinfectants used in the chemotherapy of infectious diseases. In the treatment of the eye, these drugs include pilocarpine, belladonna alkaloids, dibenzyline, hydergine, methacholine, carbachol, bethanechol, a sulfonamide and similar medicaments.

The precision fitting advantage of the lens of the present invention carries over to prevent liquid build-up behind the bandage when a medicament-carrying bandage is formed for the eyeball which extends over the scleral area under the lid. Edema which is encountered with hard, impermeable acrylic bandages is eliminated. The medicines are not concentrated in the present hydrated plastic membrane to cause osmotic swelling thereof, but are readily diffused to bathe the affected eye portion with the proper concentrations for therapeutic effectiveness. There is no dimensional change of the bandage when hypertonic concentrations of salts and medicines are applied to the eye, and this aids in the healing process.

The liquid slurry composition may be used to cast or coat an artificial eye, limb or appendage without shrinkage and to precise dimensions. In all of these uses, the coating, membrane, casting, etc. can be cleaned with hydrogen peroxide at an appropriate time.

Having thus disclosed the invention, what is claimed is:

1. A hygroscopic polymerized and irradiated composition adapted to be swollen by water to make a soft contact lens consisting essentially of 20–45% of a high molecular weight solid polyvinyl pyrrolidone onto which is graft polymerized 80–55% of monomethacrylate ester of a glycol selected from the group consisting of ethylene glycol, propylene glycol, diethylene glycol and dipropylene glycol, there being present less than 1% methacrylic acid and less than 0.2% dimethacrylate as impurities in said ester which is initiated in static condition at 40–60° C. for 4–24 hours with low temperature free-radical initiator selected from the group consisting of disecondary butyl peroxy dicarbonate, pyrrolidone acetyl peroxide and cyclohexanone peroxide in a concentration of about 0.1% by weight of said ester and polyvinylpyrrolidone and further polymerized at 90–120° C. for ½ to 2 hours with medium temperature free-radical initiator selected from the group consisting of benzoyl peroxide, diethyl peroxide, azoisobutyronitrile and orthotolyl peroxide in a concentration of about 0.1% by weight of said ester and polyvinyl pyrrolidone, said composition being substantially irradiated under high energy 250 watt ultraviolet radiation of wavelength 2000–4000 angstroms for ½ to 4 hours of X-rays at a dosage of $10^7$ roentgens for 15 minutes to 1 hour or under gamma rays in a dosage of 5 to 95 megarads for 5 minutes to 1 hour.

References Cited
UNITED STATES PATENTS

| | | | |
|---|---|---|---|
| 3,621,079 | 11/1971 | Leeds | 260—885 |
| 3,639,524 | 2/1972 | Seiderman | 260—885 |
| 3,706,818 | 12/1972 | Mageli et al. | 260—885 |

MURRAY TILLMAN, Primary Examiner

T. K. PAGE, Assistant Examiner

U.S. Cl. X.R.

260—885; 264—1